United States Patent

Arai et al.

[11] Patent Number: 5,884,984
[45] Date of Patent: Mar. 23, 1999

[54] HYDRAULIC BRAKING APPARATUS HAVING TWO SAFETY VALVES

[75] Inventors: Mitsuru Arai; Seita Hayashi; Hideki Kado; Sadao Nunotani; Mitsuru Oshiro, all of Tochigi, Japan

[73] Assignee: Komatsu Ltd., Tokyo, Japan

[21] Appl. No.: 849,595

[22] PCT Filed: Dec. 13, 1995

[86] PCT No.: PCT/JP95/02557

§ 371 Date: May 28, 1997

§ 102(e) Date: May 28, 1997

[87] PCT Pub. No.: WO96/18824

PCT Pub. Date: Jun. 20, 1996

[30] Foreign Application Priority Data

Dec. 13, 1994 [JP] Japan .................................... 6-308971

[51] Int. Cl.⁶ .................................................... F15B 11/00
[52] U.S. Cl. .................................................. 303/11; 303/2
[58] Field of Search ........................... 303/10.11, 23.15

[56] References Cited

U.S. PATENT DOCUMENTS

| 5,312,175 | 5/1994 | Ando et al. | 303/11 |
| 5,320,419 | 6/1994 | Inagawa | 303/11 |
| 5,711,582 | 7/1998 | Koike | 303/11 |
| 5,779,328 | 7/1998 | Mergenthaler et al. | 303/11 |

FOREIGN PATENT DOCUMENTS

| 57-61122 | 4/1982 | Japan . |
| 61-13761 | 4/1986 | Japan . |
| 4-133003 | 12/1992 | Japan . |

*Primary Examiner*—Matthew C. Graham
*Attorney, Agent, or Firm*—Frishauf, Holtz, Goodman, Langer & Chick

[57] ABSTRACT

There is provided a hydraulic braking apparatus, characterized in that it comprises: a first safety valve for draining a high pressure fluid at the side of a second port of a hydraulic motor into the side of a first port thereof; a second safety valve for draining a high pressure fluid at the side of the said first port of the said hydraulic motor into the side of the said second port thereof; and a braking valve adapted to be switched from a neutral position to a first position or a second position under a difference in pressure between the said first port and the said second port, the inlet side of each of the said first safety valve and the said second safety valve having a communication via the said braking valve with the side of each of the said first port and the said second port, and having an increased area of such communication when the said braking valve is set in the said neutral position and a reduced area of such communication when the braking valve is switched to the said first position or to the said second position.

4 Claims, 5 Drawing Sheets

HYDRAULIC BRAKING APPARATUS HAVING TWO SAFETY VALVES

TECHNICAL FIELD

The present invention relates to a hydraulic braking apparatus which where a hydraulic motor is used as a motor for driving a construction machine or the like and tends to continue a pumping action due to the inertia of a load when an operating valve is returned to its neutral position to stop the motor, is adapted to limit a flow of high pressure fluid that is discharged from the hydraulic motor and to apply a braking force thereto.

BACKGROUND ART

There has hitherto been known a hydraulic braking apparatus as disclosed in Japanese Unexamined Utility Model Publication No. Hei 4-133003.

Figure 1:
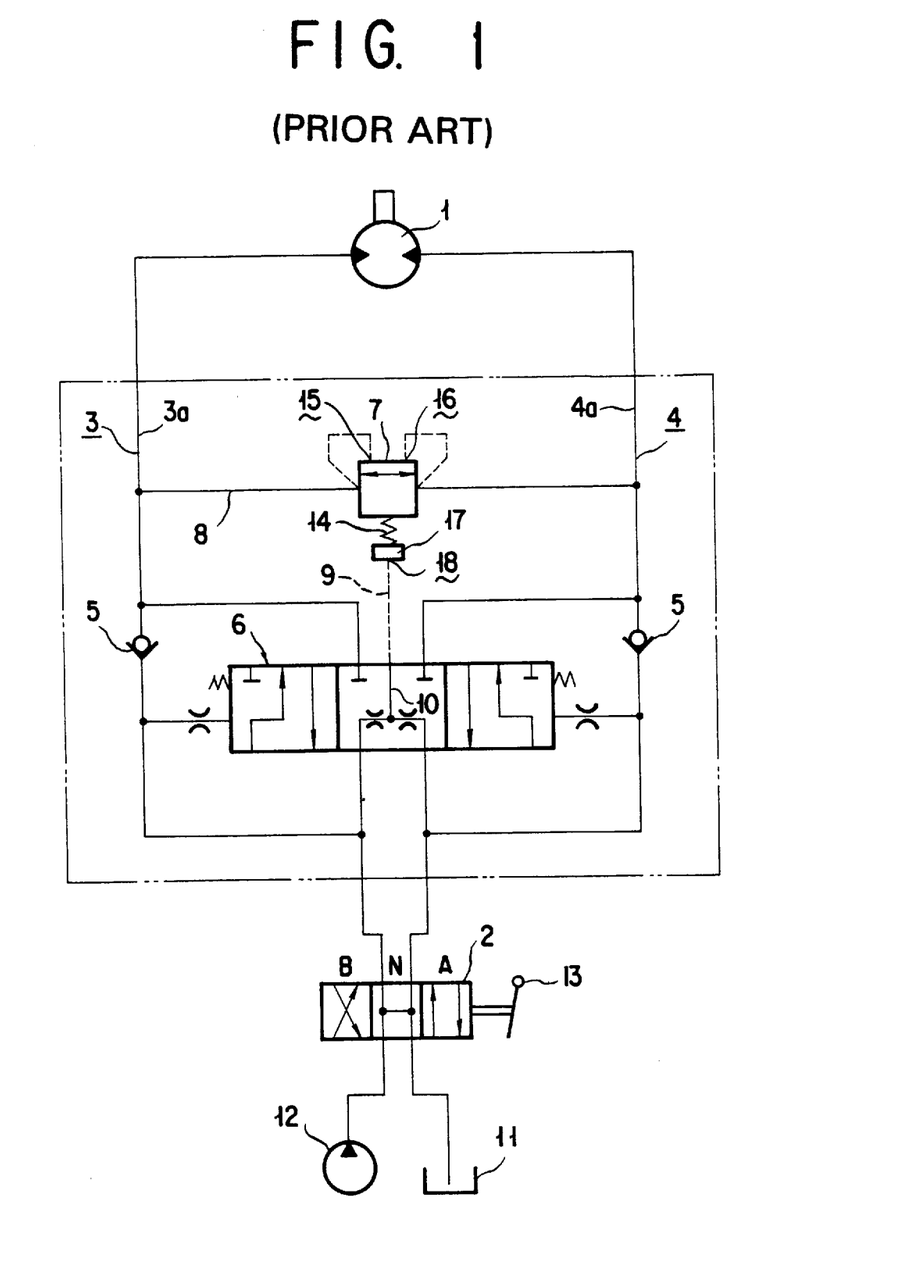
FIG. 1 is a hydraulic circuit diagram incorporating a hydraulic braking apparatus in the prior art.

According to this prior art, a first and a second main circuit 3 and 4 which are included to connect a hydraulic motor 1 to an operating valve 2 are provided with a pair of check valves 5 and 5 and a braking valve 6. When the said hydraulic motor 1 is to be stopped upon returning the said operating valve 2 to its neutral position N, the said braking valve 6 will be brought into its blocking position so that it may limit a flow of the high pressure fluid that is discharged by the said hydraulic motor 1 with its pumping action to apply a braking force thereon. The said apparatus further includes a bi-directionally operating safety valve 7 provided on a short circuit path 8 which bridge a pair of portions 3a and 4a which are located in the said first and second main circuits 3 and 4, respectively, between the said hydraulic motor 1 and the said braking valve 6.

The above mentioned safety valve 7 will be held in a closed state by a spring 14, and it will be thrusted in an opening direction under a pressure of a first, a second pressure receiving portion 15, 16. It has a construction in which the said spring 14 is retained by a piston 17 that is adapted to slide by a predetermined distance and the said piston 17 has a pressure receiving chamber 18 which is connected to a pipe conduit 9, thus being capable of being provided with a high pressure fluid. The said safety valve 7 will be held in a low pressure set state when the said pressure receiving chamber 18 is not provided with the said high pressure fluid, and will be turned to a high pressure set state when the said pressure receiving chamber is provided with the said high pressure fluid to push the said spring 14 with the said piston 17.

This being the case, it can be seen that the said safety valve 7 has the two possible pressure stages, the first with a low pressure that is determined by the spring 14 alone and the second with a high pressure that develops when the said spring 14 is thrusted by the said piston 17.

The above mentioned pipe conduit 9 is connected to an internal passageway 10 of the said braking valve 6. For this reason, when the said operating valve 2 is set by a lever 13 in its neutral position N to allow a fluid that is discharged from a hydraulic pump 12 to flow into a reservoir 11, the above mentioned pressure receiving chamber 18 will not be supplied with a high pressure fluid. Also, when the said operating valve 2 is set to take a first position A or a second position B, the fluid discharged from the said hydraulic pump 12 will be supplied into the said pressure receiving chamber 18.

With such a hydraulic braking apparatus, a said safety valve 7 in the state in which a said operating valve 2 is in its neutral position N will have a relief initiation pressure that is reduced, thus capable of lowering the pressure in a said main circuit at the high pressure side while a said hydraulic motor 1 is performing a pumping action. This will allow any shock at the time of stopping the said hydraulic motor 1 to be reduced. On the other hand, the said safety valve 7 in the state in which the said operating valve 2 is set to take a said first position A or a said second position B will have a relief initiation pressure that is increased, thus capable of increasing the drive output of the said hydraulic motor 1.

With a hydraulic braking apparatus as constructed as mentioned above, however, it has been noted that due to the fact that the relief initiation pressure, i.e., the set pressure, of the said safety valve 7 has to be altered between the two stages depending upon the fluid discharged from the said hydraulic pump 12, the said safety valve 7 needs to of variable type which is extremely complicated in structure and costly.

It should also be noted that if the said operating valve 2 that has been in the first position A to cause the said hydraulic motor 1 to be rotated in a given rotary direction is suddenly operated to take the second position B (this operation will hereinafter be referred to as "reversed lever operation"), it follows that one of the two ports of the said hydraulic motor 1 will be switched to have a low pressure from a high pressure whereas the other port will be switched to have a high pressure from a low pressure.

Then, the set pressure of the said safety valve 7 will suddenly reduced from a high pressure to a low pressure and will thereafter be suddenly elevated to a high pressure again.

In other words, since the said operating valve 2 is switched from the first position A via the neutral position N to the second position B, the set pressure of the said safety valve 7 will suddenly be switched to have an elevated pressure from a low pressure during the speed reduction period.

On the other hand, the said hydraulic motor 1 that is designed to drive bodies of inertia (i.e., bodies each having a high inertia), e.g., traveling wheels, will be rotated in the direction in which the pumping action is effected by the inertia to discharge the fluid when the said braking valve 6 is switched to the opposite side during the above mentioned reversed lever operation. Then, due to the presence of the set pressure of the said safety valve 7, a braking force will be applied to the said hydraulic motor 1.

In this case, only immediately after the said reversed lever operation the said hydraulic motor 1 will be slowly braked with the set pressure of the said safety valve having being a reduced pressure. Since, however, the set pressure of the safety valve 7 is suddenly elevated to a high pressure in a midway of the braking operation, a peak pressure will be generated on a port side of the said hydraulic motor 1, thus bringing about a cause whereby the life of the hydraulic motor 1 is reduced.

It is accordingly an object of the present invention to provide a hydraulic braking apparatus whereby a shock at the time when the hydraulic motor is stopped can be reduced and the drive output of the hydraulic motor can be increased, whilst a said peak pressure at a port side of the hydraulic motor may not be generated, thereby eliminating a possibility for the said hydraulic motor to be damaged.

SUMMARY OF THE INVENTION

In order to achieve the object mentioned above, there is provided in accordance with the present invention, in a first general form of embodiment thereof, a hydraulic braking apparatus, characterized in that it comprises: a first safety valve for draining a high pressure fluid at the side of a second port of a hydraulic motor into the side of a first port thereof; a second safety valve for draining a high pressure fluid at the side of the said first port of the said hydraulic motor into the side of the said second port thereof; and a braking valve adapted to be switched from a neutral position to a first position or a second position under a difference in pressure between the said first port and the said second port, the inlet side of each of the said first safety valve and the said second safety valve having a communication via the said braking valve with the side of each of the said first port and the said second port, and having an increased area of such communication when the said braking valve is set in the said neutral position and a reduced area of such communication when the braking valve is switched to the said first position or to the said second position.

According to the construction mentioned above, it should be noted that when the said braking valve is set in its neutral position, a high pressure fluid will smoothly flow at the upstream side of the said first, second safety valve so that the pressure at the side of the first, second port of the said hydraulic motor may be a set pressure for the said first, second safety valve and that when the braking valve is switched to the first or second position, a high pressure fluid will flow through a reduced area of communication at the upstream side of the said first, second safety valve so that the pressure at the side of the first, second port of the said hydraulic motor may be greater than the set value of the first, second safety valve. It follows, therefore, that with the said first and second safety valves each constituted by an ordinary safety valve, the first, second port side of the hydraulic motor may have a reduced pressure if the braking valve is set in its neutral position and may have an increased pressure if it is switched to the said first, second position.

Accordingly, a hydraulic braking apparatus is provided in which with the use of a pair of safety valves that may each be inexpensive, a shock that develops at the time of stopping a hydraulic motor can be reduced, which may also provide an increased drive output.

Also, in addition to having the construction, the hydraulic braking apparatus according to the present invention preferably a further construction in which:

a first main circuit provided with a first main check valve is connected to the said first port of the said hydraulic motor whereas a second main circuit provided with a second main check valve is connected to the said second port of the said hydraulic motor;

the inlet side of the said first safety valve is connected via the said braking valve and a second auxiliary check valve to the said second main circuit whereas the drain side of the said first safety valve is connected to the said first main circuit;

the inlet side of the said second safety valve is connected via the said braking valve and a first auxiliary check valve to the said first main circuit whereas the drain side of the said second safety valve is connected to the said second main circuit; and the said first check valve and the said first safety valve are made integral with each other whereas the said second check valve and the said second safety valve are made integral with each other.

According to the construction mentioned above, it should be noted that with the said first main check valve and the said first safety valve made integral with each other and the said second main check valve and the said second safety valve made integral with each other, a hydraulic braking apparatus is provided which, as a whole, has a reduced attachment area and is of a compact design.

Also, the hydraulic braking apparatus with the construction mentioned above preferably has an additional construction, in accordance with a further feature of the present invention, in which the said braking valve includes a passageway for driving a spool thereof, the said passageway being provided therein with a restriction, and further includes a main inlet port and a main outlet port, and there is provided a means such that an area of communication between the said main inlet port and the said outlet port may be increased with the said braking valve set to take the said neutral position and may be reduced with the said braking valve set to take the said first or second position, the said means comprising a first annular groove and a second annular groove which are formed on a peripheral surface of the said spool and have a large and a small cross sectional area, respectively.

According to the construction mentioned above, it should be noted that where the pressure at the first, second port side of the hydraulic motor is switched from low to high by the said braking valve being switched from its neutral position to the said first, second position, the said spool of the above mentioned brake valve will be slowly switched in position. In addition, it can be seen that since the above mentioned spool is provided with the means whereby the said area of communication can be increased with said brake valve set in its neutral position and can be decreased with said braking valve switched to the said first or second position, the pressure will be allowed to slowly change. Accordingly, a hydraulic braking apparatus is provided in which at the time of the reversed lever operation a peak pressure can not be generated at the said first, second port side, thus preventing the said hydraulic motor from being damaged in any way whatsoever.

BRIEF EXPLANATION OF THE DRAWINGS

The present invention will better be understood from the following detailed description and the drawings attached hereto showing certain illustrative embodiments of the present invention. In this connection, it should be noted that such embodiments as illustrated in the accompanying drawings are intended in no way to limit the present invention but to facilitate an explanation and understanding thereof.

In the accompanying drawings.

BEST MODES FOR CARRYING OUT THE INVENTION

Hereinafter, suitable embodiments of the present invention with respect to a hydraulic braking apparatus will be set forth with reference to the accompanying drawings hereof.

Figure 2:
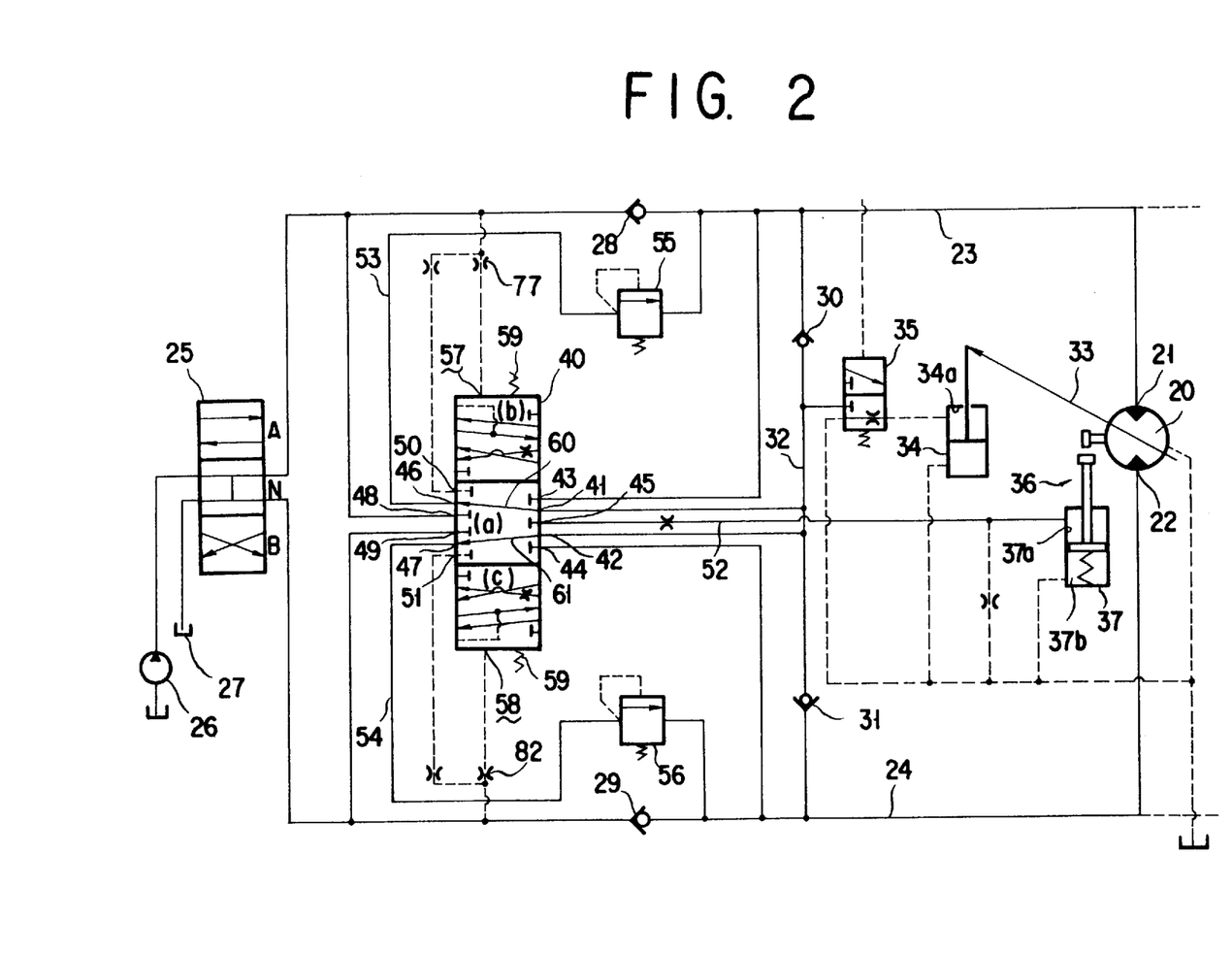
FIG. 2 is a hydraulic circuit diagram incorporating a certain embodiment of the hydraulic braking apparatus according to the present invention.

As shown in FIG. 2, a hydraulic motor 20 has a first port 21 and a second port 22 which are connected to a first main circuit 23 and a second main circuit 24, respectively. Both of the said first and second main circuits 23 and 24 are connected via an operating valve 25 to a hydraulic pump 26 and a reservoir 27. The said operating valve 25 is provided to serve to control a fluid supply.

The above mentioned operating valve 25 has its neutral position N that is adapted to connect the said first and second main circuits 23 and 24 to the said hydraulic pump 26 and the said reservoir 27, a first position A that is adapted to connect the said first main circuit 23 to the said hydraulic pump 26 whilst connecting the said second main circuit 24 to the said reservoir 27, and a second position B that is adapted to connect the said second main circuit 24 to the said hydraulic pump 26 whilst connecting the said first main circuit 23 to the said reservoir 27, the said positions N, A and B being switchable from one to another.

The above mentioned first and second main circuits 23 and 24 are provided with a first and a second main check valve 28 and 29, respectively, and are interconnected by a short circuit path having a first and a second auxiliary check valve 30 and 31 between a junction that connects the said first main check valve 28 and the said hydraulic motor 20 and a junction that connects the said second main check valve 29 to the said hydraulic valve 20.

A braking valve 40 that is constituted by a counterbalance valve, is designed to connect and disconnect between a first and a second main inlet port 41 and 42, a first and a second inlet port 43 and 44 and an outlet port on the one hand and a first and a second outlet port 46 and 47, a first and a second port 48 and 49 and a first and a second pilot port 50 and 51 on the other hand. It should further be noted that the said first and second main inlet ports 41 and 42 are connected to the said short circuit path 32; the said first and second inlet ports 43 and 44 are connected to the said first main circuit 23 and the said second main circuit 24, respectively, between the said first main check valve 28 and the said hydraulic motor 20 and between the said second main check valve 29 and the said hydraulic motor 20, respectively; and the said outlet port 45 is connected to a braking circuit 52.

The above mentioned first and second outlet ports 46 and 47 are connected to a first and a second drain circuit 53 and 54, respectively, which are in turn provided with a first and a second safety valve 55 and 56, respectively, and are connected to the said first and second main circuits 23 and 24, respectively, between the said first main check valve 28 and the said hydraulic motor 20 and between the said second main check valve 29 and the said hydraulic motor 20, respectively.

The above mentioned first and second ports 48 and 49 are connected to the said first and second main circuits 23 and 24, respectively, between the said first main check valve 28 and the said operating valve 25 and between said second main check valve 29 and the said operating valve 25, respectively.

The said braking valve 40 further is provided with a first and a second pressure receiving portion 57 and 58 which are connected with their respective pilot passageways in which a restriction 77 and a restriction 82 are incorporated, respectively. There is also provided a spring 59 that is designed to hold the said braking valve 40 in its neutral position a unless the said first or second pressure receiving portion 57 or 58 is furnished with a fluid.

The above mentioned hydraulic motor 20 is of variable capacity type in which a swash plate 33 provided to alter its capacity is inclined by a cylinder 34 rod and a retraction side chamber 34a therein is furnished and drained with a fluid in the above mentioned short circuit path 32 via a capacity switching valve 35 to retract and extend the said cylinder 34 rod, thereby controlling the capacity.

The above mentioned hydraulic motor 20 is provided with a brake 36 whose brake cylinder 37 has its retraction side chamber 37a that is connected to the above mentioned braking circuit 52, which in turn is provided therein with a pressure reduction valve 38.

As shown in FIG. 2, when the said operating valve 25 is set to take its neutral position N, the said braking valve 40 will not have a fluid furnished to its first and second pressure receiving portions 57 and 58 and will thus be held in its neutral position a by means of the said spring 59 so that the said first main inlet port 41 may communicate with the said first outlet port 46 and the said second main inlet port 42 may communicate with the said second outlet port 47, while blocking the other ports. And, when the brake valve 40 is in the said neutral position a, the said hydraulic motor 20 will perform a pumping action.

Thus, for example, when the said operating valve 25 is switched to take its neutral position N from the said first position A, the said hydraulic motor 20 initiates a pumping action, thereby developing an elevated pressure in m the said second main circuit 24 and a reduced pressure (i.e., a suction) in the said first main circuit 23.

Since a fluid of this elevated pressure is allowed to flow through the short circuit pass 32, the said first main inlet port 41, a first main communication passageway 60, the said first outlet port 46 and the said first drain circuit 53 and to be drained from the said first safety valve 55 into the said first main circuit 23, it can be seen that the pressure in the said second main circuit 24 will be the set pressure for the said first safety valve 55. It should be noted at this point that a fluid which is allowed to flow from the said second main inlet port 42 through a second main communication passageway 61, the said second outlet port 47 and the said second drain circuit 54 to the said second safety valve 56 will not be drained into the said second main circuit 24 since the latter is at an elevated pressure as mentioned above.

It may further be noted that if the said operating valve 25 is switched to take its neutral position N from the said second position B, thus developing an elevated pressure in the said first main circuit 23 and a reduced pressure in the said second main circuit 24, similarly to the above a fluid of the said elevated pressure in the first main circuit 23 will be allowed to flow from the said second main inlet port 42 through the said second main passageway 61 and the said second outlet port 47 to the said drain circuit 54 and then to be drained from the said second safety valve 56 into the said second main circuit 24, thereby causing the pressure in the said first main circuit 23 to be the set pressure for the said second safety valve 56.

In this instance, since a fluid is not allowed to flow into the said braking circuit 52, the said braking cylinder 37 rod will be extended by means of the said spring 37b to apply a braking force to the said hydraulic motor 20 with the said brake 36.

Now, let it be assumed that the said operating valve 25 is set to take the first position A to supply the said first main circuit 23 with a high pressure fluid and the said second main circuit 24 is communicated with the said reservoir 27 to rotate the said hydraulic motor 20 in the direction of the arrow.

Figure 3:
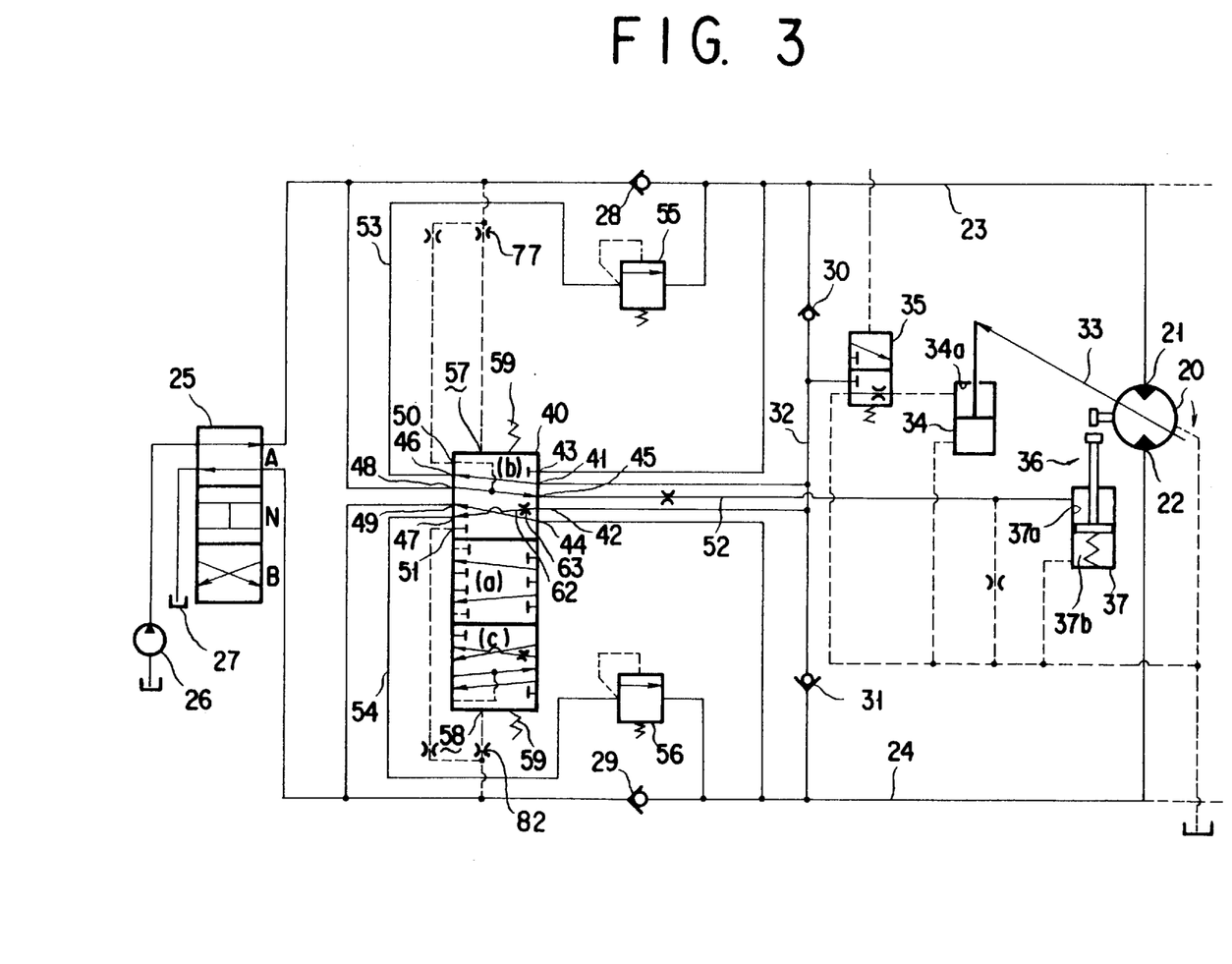
FIG. 3 is a hydraulic circuit diagram illustrating the above mentioned embodiment of the invention in which a braking valve is set to take a first position.

Then, the high pressure fluid in the said first main circuit 23 will be allowed to flow into the the first pressure receiving portion 57 of the said braking valve 40 to set the latter to take the first position b as shown in FIG. 3.

When the said braking valve 40 is set to take the first position b, it can be seen that the said first main inlet port 41 will be communicated with the said first outlet port 46, the said first port 48 will be communicated with the said outlet port 45 and the said first pilot port 50, the said second main inlet port 42 will be communicated with the said second outlet port 47, and the said second inlet port 44 will be communicated with the said second port 49.

This will allow the hydraulic motor 20 side and the operating valve 25 side of the said second main check valve 29 in the said second main circuit 24 to communicate with each other via the second inlet port 44 and the second port 49 whilst permitting the drain side of the said second safety valve 56 to communicate with the said reservoir 27 via the said operating valve 25.

It follows, therefore, that the high pressure fluid in the said first main circuit 23 will be allowed to flow through the said short circuit path 32, the said second main inlet port 42 and the said second outlet port 47 to the said second drain circuit 54 and then to be drained through the said second safety valve 56 into the said reservoir 27. It should be noted, however, that since the said second main inlet port 42 and the said second outlet port 47 communicate with each other via a first communication passageway 62 which is provided therein with a first restriction 63 designed to reduce the area of such a communication, the pressure in the said first main circuit 23 will be made higher than the set pressure for the said second safety valve 56 by a pressure that is commensurate with the restriction diameter of the above mentioned first restriction 63.

In other words, with the pressure at the downstream side of the said first restriction 63 being the set pressure for the said second safety valve 56, the pressure at the upstream side of the first restriction 63 will be greater than the said downstream side pressure; thus it will be made higher by a pressure that is commensurate with the restriction diameter of the said first restriction 63.

On the other hand, with the said outlet port 45 and the said first port 48 communicating with each other to allow the high pressure fluid in the said first main circuit 23 to flow into the said braking circuit 52 and then to be supplied into the retraction side cylinder 37a of the said brake cylinder 37, the said brake 36 will be rendered inoperative.

Figure 4:
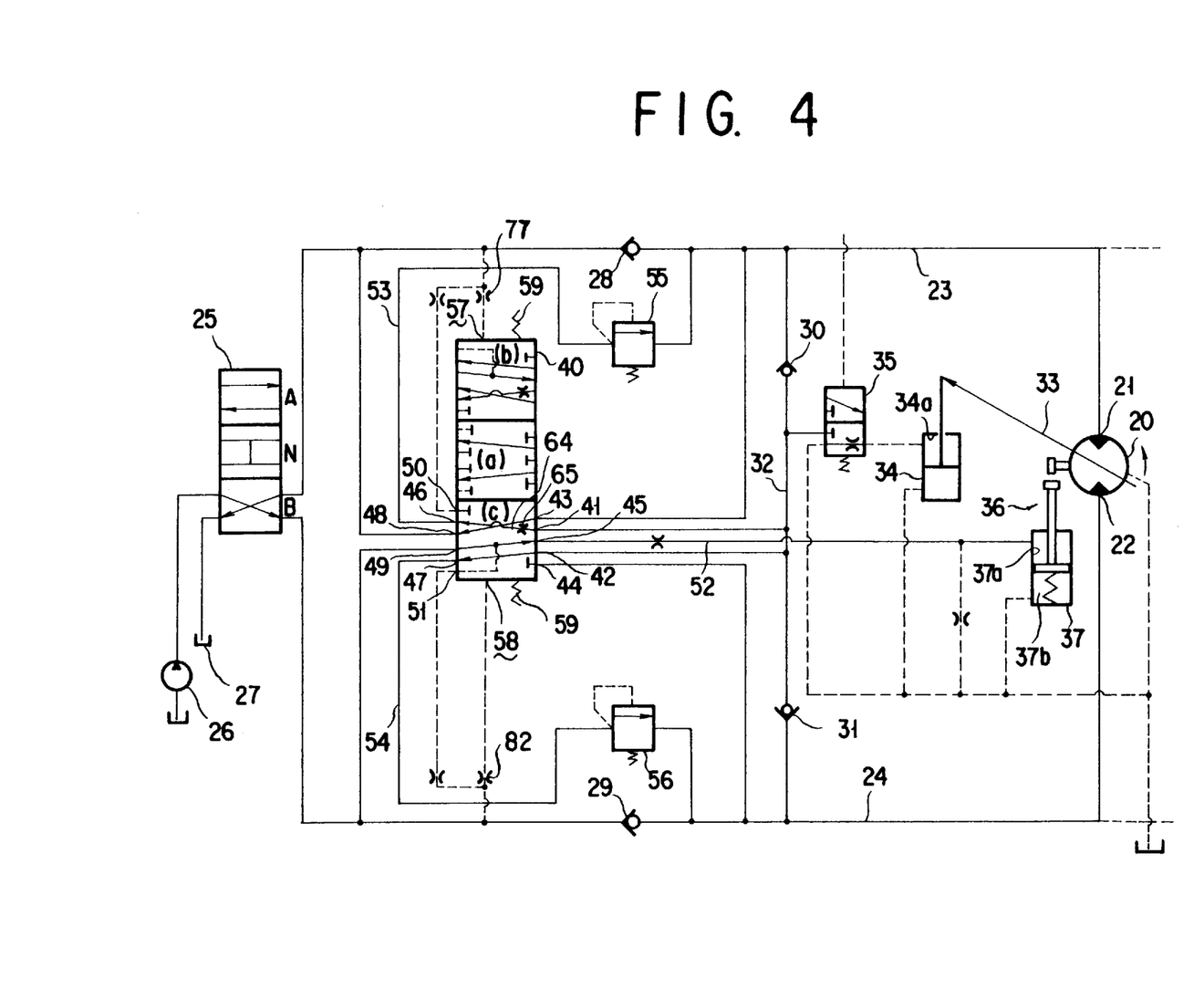
FIG. 4 is a hydraulic circuit diagram illustrating the above mentioned embodiment of the invention in which the braking valve is set to take a second position.

Now let it be assumed that the said operating valve 25 is set to take the second position B to allow a high pressure fluid to be supplied into the said second main circuit 24 and to allow the said first main circuit 23 to communicate with the said reservoir 27 to rotate the said hydraulic motor 20 in the direction of arrow as shown in FIG. 4.

In this instance, the high pressure fluid in the said second main circuit 24 will be allowed to flow into the said second pressure receiving portion 58 of the said braking valve 40 to set the latter to take the position c as shown in FIG. 4.

If the said braking valve 40 is set to take the second position c, it can be seen that the said first main inlet port 41 will communicate with the said first outlet port 46, the said second port 49 will communicate with the said outlet port 45 and the said second pilot port 51, the said second main inlet port 42 will communicate with the said second outlet port 47, and the said first inlet port 43 will communicate with the said first port 48.

This will cause the hydraulic motor 20 side and the operating valve 25 side of the first main check valve 28 in the said first main circuit 23 to communicate with each other via the first inlet port 43 to the first port 48 of the said braking valve 40 whilst permitting the drain side of the said first safety valve 55 to communicate with the said reservoir 27 via the said operating valve 25.

It follows, therefore, that the high pressure fluid in the second main circuit 24 will be allowed to flow through the said short circuit path 32, the said first main inlet port 41, a second communication passageway 64 and the said first outlet port 46 to the said first drain circuit 53 and then to be drained from the said first safety valve 55 into the said reservoir 27. It should be noted, however, that since the said first main inlet port 41 and the said first outlet port 46 communicate with each other through a second communication passageway 64 that is provided therein with a second restriction 65 designed to reduce the area of such a communication, the pressure in the said second main circuit 24 will be made higher than the set pressure for the said first safety valve 55 by a pressure that is commensurate with the restriction diameter of the above mentioned second restriction 65.

In other words, with the pressure at the downstream side of the said second restriction 65 being the set pressure for the said first safety valve 55 and the pressure at the upstream side of the second restriction being higher than the said downstream side pressure; thus it will be made higher by a pressure that is commensurate with the restriction diameter of the said second restriction 65.

On the other hand, since the said outlet port 45 and the said second port 49 communicate with each other to allow the high pressure fluid in the said second main circuit 24 to flow into the said braking circuit 52 and to be supplied into the retraction side chamber 37a of the said brake cylinder 37, the said brake 36 will be rendered inoperative.

Now let it be assumed that the said operating valve 25 is switched to take the second position B from the first position A, i.e. at the time of a reversed lever operation.

As in the prior art, the first port 21 side of the said hydraulic motor 20 will be switched from high to low in pressure whilst its second port 22 side will be switched from low to high in pressure, and at the same time the said braking valve 40 will be switched from the first position b through the neutral position a to the second position c.

Then, the set pressure for the said first, second safety valve 55, 56 will through the switching of the said braking valve 40 be altered from a high pressure to a low pressure and will then be resumed to a high pressure, whilst the said braking valve 40 will in the presence of the said restrictions 77 and 82 in its pilot passageways be switched slowly over the first position b, the neutral position a and the second position c with a given interval. Since also the above mentioned braking valve 40 is provided with a means to be described later for increasing the area of communication therein if it is set to take the neutral position and reducing the area of communication therein if it is set to take either the first or second position, the set pressure of the said first, second safety valve 55, 56 will be switched slowly from a high pressure to a low pressure and vice versa.

For this reason, there will be no instance in which a peak pressure may be generated at the first or second port 21 or 22 of the said hydraulic motor 20 in a case where a said hydraulic motor 20 is used to drive bodies of inertia such as wheels for travel.

An explanation will next be given with respect to a specific structure of the said braking valve 40.

Figure 5:
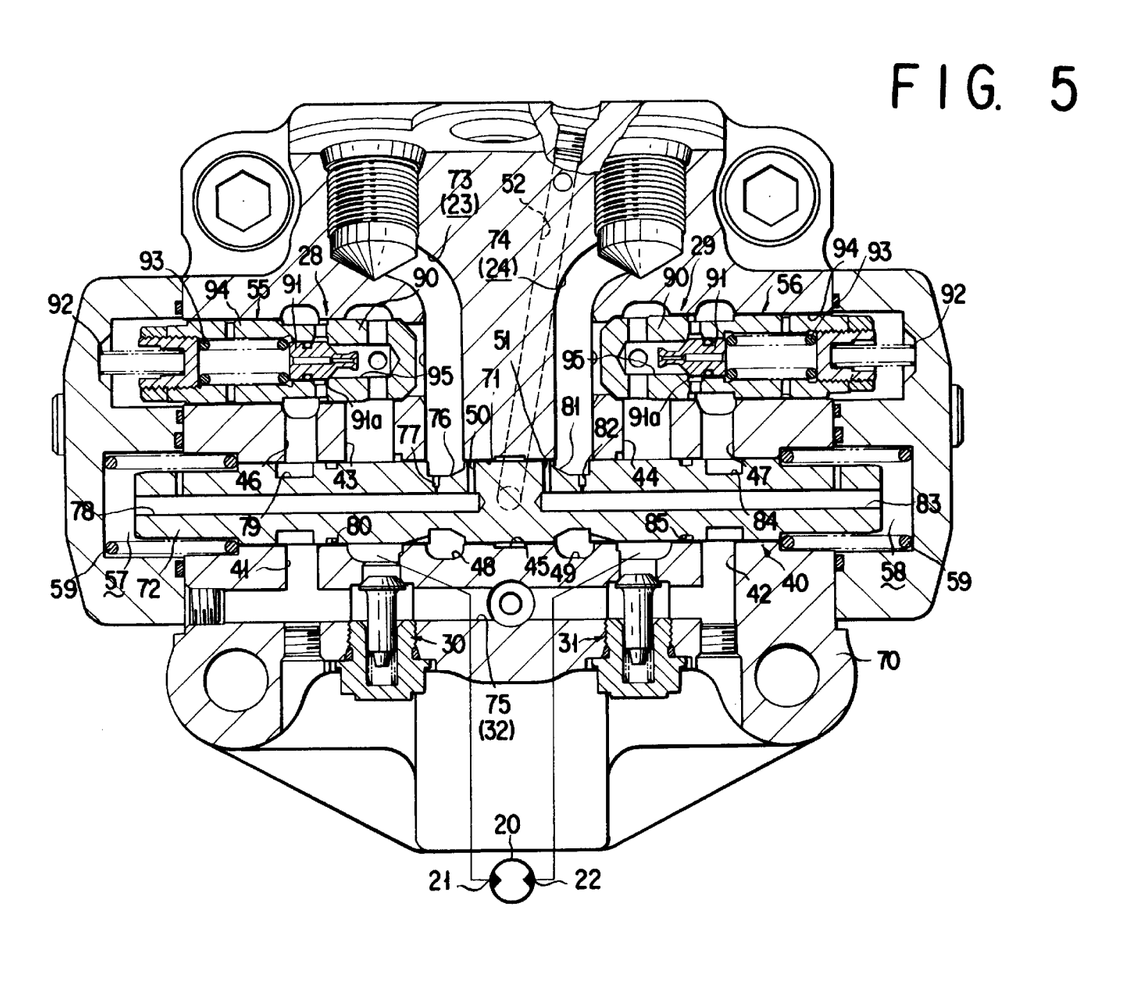
FIG. 5 is a cross sectional view illustrating the above mentioned braking unit.

As shown in FIG. 5, the hydraulic motor 20 has a valve body 70 such as constructed of a housing, which is formed therein with a spool bore 71 that in turn is formed at its longitudinal intermediate portion with the above mentioned outlet port 45. At the left side of the said outlet port 45 there are formed the said first main inlet port 41, the said first inlet port 43, the said first outlet port 46 and the said first port 48. At the right side of the outlet port 45 there are formed the said second main inlet port 42, the said second inlet port 44, the said second outlet port 47 and the said second port 49. And, the above mentioned spool bore 71 has a spool 72 slidably inserted, thus completing a construction of the said braking valve 40.

The said valve body 70 is also formed therein with a first main inlet passage 73 (that corresponds to the said first main circuit 23) which communicates with the said first port 48, a second main inlet passage 74 (that corresponds to the said second main circuit 24) which communicates with the said second port 49, and a fluid passage 75 (that corresponds with the said short circuit path 32) which communicates the said first main inlet port 41 and the said second main inlet port 42 with each other.

Closer to the left hand side in the above mentioned valve body 70 there are provided the said first main check valve 28, the said first check valve 30 and the said first safety valve 55. Closer to the right hand side in the above mentioned valve body 70 there are provided the said second main check valve 29, the said second check valve 31 and the said second safety valve 56. And, the inlet side of the said first safety valve 28 is open to the said first main inlet passage 73 and its outlet side is arranged to communicate with the said first inlet port 43 which in turn is arranged to communicate with the said fluid passage 75 via the said first check valve 30. The inlet side of the above mentioned second safety valve 29 is open to the said second main inlet passage 73 and its outlet side is arranged to communicate with the said second inlet port 44 which in turn is arranged to communicate with the said fluid passage 75 via the said second check valve 31.

The above mentioned spool 72 is formed with a small diameter portion for establishing and blocking a communication between the said first port 48 and the said first inlet port 43. The said small diameter portion 76 is formed to communicate with the said first pressure receiving portion 57 via a first narrow hole (i.e., restriction) 77 and a first axial bore 78. Also, the said spool 72 is formed with a first annular groove 79 and a second annular groove 80 for establishing and blocking a communication between the said first main inlet port 41 and the said first outlet port 46. The said first annular groove 79 is greater in the area of opening than the said second annular groove 80 so that when the said spool 72 is set to take its neutral position as shown the said first main inlet port 41 and the said first outlet port 46 may communicate with each other via the said first annular groove 79 to form the previously mentioned first main communication passageway 60 and that when the said spool 72 is thrusted slidably leftwards the said first main inlet port 41 and the said first outlet port 46 may communicate with each other via the said second annular groove 80 (that corresponds to the said first restriction 63) to form the previously mentioned first communication passageway 62.

The above mentioned spool 72 is formed with the previously mentioned first pilot port 50 that is here open to the said first axial bore 78. The said first pilot port 50 is adapted to be closed when the said spool 72 is set in the neutral position and to communicate with the said first port 48 when it is thrusted slidably leftwards.

The above mentioned spool 72 is formed with a second small diameter portion 81 for establishing and blocking the said second port 49 and the second inlet port 44. The said small diameter portion 81 is formed to communicate with the previously mentioned second pressure receiving portion 58 via a second narrow hole (i.e., a restriction) 82 and a second axial bore 83. Also, the said spool 72 is formed with a first annular groove 84 and a second annular groove 85 (that corresponds to the previously mentioned restriction 65) for establishing and blocking a communication between the said second main inlet port 42 and the said second outlet port 47. The said first annular groove 84 is greater in the area of opening than the said second annular groove 85 so that when when the said spool 72 is set to take the neutral position as shown the said second main inlet port 42 and the said second outlet port 47 may communicate with each other via the said first annular groove 84 to form the previously mentioned second communication passageway 61 and that when the said spool 72 is thrusted slidably rightwards the said second main inlet port 42 and the said second outlet port 47 may communicate with each other via the said second annular groove 85 to form the previously mentioned second communication passageway 64.

The above mentioned spool 72 is formed with the previously mentioned second pilot port 51 that is here open to the said second axial bore 83. The said second pilot port 51 is adapted to be closed when the said spool 72 is set to take the neutral position and to communicate with the said second port 49 when the said spool 72 is thrusted slidably rightwards.

The above mentioned first check valve 28 and the first safety valve 55 are integrally constructed.

More specifically, there are provided there a check valve sleeve 90, a safety valve poppet 91, a check valve spring 92 and a safety valve spring 93, the said check valve sleeve 90 being slidably inserted in a valve bore 94 of the said valve body 70 and adapted to block a communication between the said first main inlet passage 73 and the said first inlet port 43 with the said check valve spring 92 and to establish the said communication when thrusted with a high pressure fluid within the said first main inlet passage 73.

The said check valve sleeve 90 is formed therein with a fluid passage 95 for establishing a communication between the said first outlet port 46 and the said first inlet port 43. The said fluid passage 95 is adapted to block the said communication with the said safety valve poppet 91, which in turn is adapted to be thrusted by the high pressure fluid acting from the said first outlet port 46 onto a pressure receiving portion 91a to establish the said communication.

It should be noted at this point that the second main check valve 29 and the second safety valve 56 which have previously been mentioned are each likewise constructed as mentioned above.

It will be apparent that the first main inlet fluid passage 73 and the second main inlet fluid passage 35 which have been mentioned above is connected to the previously mentioned operating valve 25 and the said first and second inlet ports 43 and 44 are connected to the the first and second ports 21 and 22 of the said hydraulic motor 20, respectively.

An explanation will now be given of the operation of the braking valve 40 mentioned.

The state in which a said spool 72 as shown in FIG. 5 is set in its neutral position represents the state shown in FIG. 2. In this state, if the first port 21 side of the said hydraulic motor 20 is under a high pressure, the fluid at the said first inlet port 43 will have an increased pressure. And, this high pressure fluid will force to open the said first check valve 30 and will thus flow through the said fluid path 75, the said second main inlet port 42 and the said first annular groove 84 into the said second outlet port 47 to open the poppet 91 of the said second safety valve 56. Thus, flowing from the said fluid path 95 into the said second inlet port 44, the said fluid will be sucked into the said second port 22 of the hydraulic motor 20.

Then, the high pressure of the fluid flowing from the said first annular groove 84 that is large in the area of opening will act onto the said pressure receiving portion 91a of the poppet 91 of the said second safety valve 56. Accordingly, the pressure at the first port 21 side of the said hydraulic motor 20 will, as in the case shown in FIG. 2 and previously described, be the set pressure for the said second safety valve 56.

Then, with a high pressure fluid flowing into the said first main inlet passage 73, the said spool 72 will be moved slidably rightwards from the state shown in FIG. 5 to establish a communication between the said first port 48 and the said outlet port 45, a communication between the said second port 49 and the said second outlet port 44, and a communication via the said second annular groove 85 between the said second main inlet port 42 and the said second outlet port 47, thus bringing about the state shown in FIG. 3.

If in this state the fluid in the said first main inlet passage 73 is elevated in pressure, it will, as in the case mentioned previously, be allowed to flow through the said poppet 91 of the second safety valve 56 into the said second inlet port 44 and then to be drained into the said second main inlet passage 74. While flowing in the meantime through the said second annular groove 85 having the reduced area of opening, the fluid will then be pinched to develop a pressure drop. As a consequence, it should be apparent that the pressure in the said first main inlet passage 73 will be made greater than the set pressure for the said second safety valve 56.

It will also be apparent that when the said spool 72 that has been slidably moved rightwards is to be restored to its neutral position, the configuration is here adopted in which the fluid in the said first pressure receiving chamber 57 is then allowed to flow out through the said first axial bore 78 and the said first narrow hole 77, thus permitting the said spool 72 to be so slowly restored to the neutral position.

From the foregoing description with respect to the operation of the said braking valve, it should further be noted that with the said first main check valve 28 and the said first safety valve 55 made integral with each other and the said second check valve 29 and the said safety valve 56 made integral with each other, an improved hydraulic braking apparatus is constructed which, as a whole, has a reduced attachment area and is of a compact design.

As set forth in the foregoing description, in a hydraulic braking apparatus according to the present invention it can be seen that when the said braking valve 40 is set in its neutral position a, a high pressure fluid will smoothly flow at the upstream side of the said first, second safety valve 55, 56 so that the pressure at the side of the first, second port 21, 22 of the said hydraulic motor 20 may be a set pressure for the said first, second safety valve 55, 56 and that when the braking valve 40 is switched to the first or second position b or c, a high pressure fluid will flow through a reduced area of communication at the upstream side of the first, second safety valve 55, 56 so that the pressure at the side of the first, second port 21, 22 of the said hydraulic motor 20 may be greater than the set value for the said first, second safety valve 55, 56. It follows, therefore, that with the said first and second safety valves 55 and 56 each constituted by an ordinary safety valve, the first, second port side 21, 22 of the hydraulic motor may 20 have a reduced pressure if the braking valve 40 is set in its neutral position a and may have an increased pressure if it is switched to the said first, second position b, c.

Accordingly, a hydraulic braking apparatus is provided in which with the use of a pair of safety valves 55 and 56 that may each be inexpensive, a shock that develops at the time of stopping a hydraulic motor 20 can be reduced which may also provide an increased drive output.

And yet, where the pressure at the first, second port 21, 22 side of the hydraulic motor 20 is switched from low to high by the said braking valve 40 being switched from its neutral position a to the said first b, second position c, the pressure will be allowed to slowly change. Accordingly, a hydraulic braking apparatus is provided in which at the time of the reversed lever operation a peak pressure can not be generated at the said first, second port 21, 22 side, thus preventing the said hydraulic motor 20 from being damaged in any way whatsoever.

According to the present invention, in a further aspect thereof, it can also be seen that with the said first main check valve 28 and the said first safety valve 55 made integral with each other and the said second main check valve 29 and the said second safety valve 56 made integral with each other, a hydraulic braking apparatus is provided which, as a whole, has a reduced mounting area and is of a compact configuration.

While the present invention has hereinbefore been set forth with respect to certain illustrative embodiments thereof, it will readily be appreciated by a person skilled in the art to be obvious that many alterations thereof, omissions therefrom and additions thereto can be made without departing from the essence and the scope of the present invention. Accordingly, it should be understood that the present invention is not limited to the specific embodiments thereof set out above, but includes all possible embodiments thereof that can be made within the scope with respect to the features specifically set forth in the appended claims and encompasses all equivalents thereof.

What is claimed is:

1. A hydraulic braking apparatus, characterized in that it comprises:

a first safety valve for draining a high pressure fluid at the side of a second port of a hydraulic motor into the side of a first port thereof;

a second safety valve for draining a high pressure fluid at the side of said first port of said hydraulic motor into the side of said second port thereof; and a braking valve adapted to be switched from a neutral position to a first position or a second position under a difference in pressure between said first port and said second port, the inlet side of each of said first safety valve and said second safety valve having a communication via said braking valve with the side of each of said first port and said second port, and having an increased area of such communication when said braking valve is set in said neutral position and a reduced area of such communication when the braking valve is switched to said first position or to said second position.

2. A hydraulic braking apparatus as set forth in claim 1, in which:

a first main circuit provided with a first main check valve is connected to said first port of said hydraulic motor whereas a second main circuit provided with a second main check valve is connected to said second port of said hydraulic motor;

the inlet side of said first safety valve is connected via said braking valve and a second auxiliary check valve to said second main circuit whereas the drain side of said first safety valve is connected to said first main circuit;

the inlet side of said second safety valve is connected via said braking valve and a first auxiliary check valve to said first main circuit whereas the drain side of said second safety valve is connected to said second main circuit; and said first check valve and said first safety valve are made integral with each other whereas said second check valve and said second safety valve are made integral with each other.

3. A hydraulic braking apparatus, as set forth in claim 1, in which:

said braking valve includes a passageway for driving a spool thereof, said passageway being provided therein with a restriction, and further includes a main inlet port and a main outlet port, and there is provided a means such that an area of communication between said main inlet port and said outlet port may be increased with said braking valve set to take said neutral position and may be reduced with said braking valve set to take said first or second position, said means comprising a first annular groove and a second annular groove which are formed on a peripheral surface of said spool and have a large and a small cross sectional area, respectively.

4. A hydraulic braking apparatus, as set forth in claim 2, in which:

said braking valve includes a passageway for driving a spool thereof, said passageway being provided therein with a restriction, and further includes a main inlet port and a main outlet port, and there is provided a means such that an area of communication between said main inlet port and said outlet port may be increased with said braking valve set to take said neutral position and may be reduced with said braking valve set to take said first or second position, said means comprising a first annular groove and a second annular groove which are formed on a peripheral surface of said spool and have a large and a small cross sectional area, respectively.

* * * * *